Patented Sept. 11, 1945

2,384,749

UNITED STATES PATENT OFFICE 2,384,749

MONOAZO DYESTUFFS

Arthur Howard Knight, Blackley, Manchester, England, assignor to Imperial Chemical Industries Limited, a corporation of Great Britain No Drawing. Application August 4, 1941, Serial No. 405,445. In Great Britain August 5, 1940

5 Claims. (Cl. 260—163)

The present invention relates to valuable new monoazo acid dyestuffs suitable for colouring animal fibres.

According to the invention I manufacture the dyestuffs by diazotising an amine of the general formula

X—CO—NY—R—NH₂ wherein R stands for a phenylene nucleus which may carry simple azo dyestuff substituents, for example sulphonic acid, methyl or methoxy groups, X stands for a monochloro- or monobromo-alkyl radical having not more than three carbon atoms, and Y stands for hydrogen, or for an alkyl, aralkyl or cycloalkyl radical of not more than 7 carbon atoms, or for a phenyl radical which may be substituted as is R and combining the diazo compound so-obtained with a coupling component of the pyrazolone series or a naphthol or a naphthol-sulphonic acid, the diazo and coupling components being so selected that at least one of them contains a sulphonic acid group.

Also according to the invention we use the dyestuffs in colouring animal fibres, e. g., wool and silk.

The amines employed according to the invention in which Y in the above general formula is alkyl, aralkyl, cycloalkyl or phenyl, substituted or not, are obtained by reacting the appropriate nitro-secondary amine with an appropriate halogenoacyl halide in an inert solvent such as dry toluene followed by reduction of the nitro group of the acylated compound so-obtained.

As examples of some of the most easily obtainable diazo components which can be used in the invention, we mention 4-amino-1-N-ethyl-ω-chloroacetanilide (M. P. 105–6° C.) (obtained by reacting 4-nitroethylaniline with chloroacetyl chloride in dry toluene to give 4-nitro-1-N-ethyl-ω-chloroacetanilide—M. P. 141° C.—and reducing the nitro compound with iron and hydrochloric acid in ethyl alcohol solution), 3-amino-ω-chloroacetanilide-4-sulphonic acid (obtained by adding to a stirred aqueous solution of the sodium salt of 1:3-diaminobenzene-4-sulphonic acid rather more than one molecular proportion of chloroacetyl chloride dissolved in dry acetone at ordinary temperature in the presence of an acid binding agent, e. g., sodium acetate), 4-amino-1-N-benzyl-ω-chloroacetanilide (made from 4-nitrobenzylaniline and chloroacetyl chloride by a similar method to that for 4-amino-1-N-ethyl-ω-chloroacetanilide above) (M. P. of 4-nitro-1-N-benzyl-ω-chloroacetanilide, 76° C.), and 4-amino-2-N-ethyl-ω-chloroacet-toluidide (M. P. 103–4° C.) (obtained by reacting 4-nitro-2-N-ethyltoluidine with chloroacetyl chloride to give 4-nitro-2-N-ethyl-ω-chloroacet-toluidide—M. P. 110° C.—and reducing the latter with iron and hydrochloric acid in ethyl alcohol solution).

Further to illustrate the group X.CO— in the general formula above the ω-chloroacetyl-, ω-bromoacetyl-, ω-chloropropionyl-, and ω-bromopropionyl-groups are mentioned.

As examples of pyrazolone coupling components which may be used according to the invention, I may mention 1-(4'-sulphophenyl)-3-methyl-5-pyrazolone,
1-(3'-sulphophenyl)-3-methyl-5-pyrazolone,
1-(2'-chloro-5'-sulphophenyl)-3-methyl-5-pyrazolone,
1-(2':5'-dichloro-4'-sulphophenyl)-3-methyl-5-pyrazolone,
1-(6'-chloro-3'-methyl-4'-sulphophenyl)-3-methyl-5-pyrazolone,
1-(4'-chloro-2'-sulphophenyl)-3-methyl-5-pyrazolone,
1-(2'-methyl-5'-sulphophenyl)-3-methyl-5-pyrazolone,
1-(3'-carboxyphenyl)-3-methyl-5-pyrazolone,
1-(2'-chloro-4'-methyl-5'-sulphophenyl)-3-methyl-5-pyrazolone,
1-(2':5'-disulphophenyl)-3-methyl-5-pyrazolone,
1-(4'-sulphonaphthyl)-3-methyl-5-pyrazolone,
1-(4'-ethoxy-2'-sulphophenyl)-3-methyl-5-pyrazolone,
1-(4'-sulphophenyl)-5-pyrazolone-3-carboxylic acid,
1-phenyl-3-methyl-5-pyrazolone,
1-(2'-chlorophenyl)-3-methyl-5-pyrazolone,
1-phenyl-5-pyrazolone-3-carboxylic acid ethyl ester.

As examples of naphthol and naphtholsulphonic acid coupling components which can be used according to the invention, I mention α- and β-naphthols, 1-naphthol-4 and 5-sulphonic acids, 1-naphthol-3:6-disulphonic acid, 2:6-naphtholsulphonic acid, 2:8-naphtholsulphonic acid, 2-naphthol-3:6-disulphonic acid, 2-naphthol-6:8-disulphonic acid.

The new dyestuffs are soluble in water and dye wool from sulphuric acid baths in yellow to scarlet shades, the dyeings being characterised by very good fastness to severe washing and milling. In these respects the pyrazolone members are faster than the corresponding yellow pyrazolone dyestuffs of British Patents Nos. 216,971 and 313,110. They are also suitable for dyeing other animal fibres such as silk and leather.

Example 1

21.25 parts of 4-amino-1-N-ethyl-ω-chloroacetanilide are dissolved in 320 parts of water and 25 parts of 36% hydrochloric acid and then 6.9 parts of sodium nitrite are added to the resulting solution. The diazo compound so obtained, after cooling to 5°–10° C. is added to a solution of 33 parts of 1-(2':5'-dichloro-4'-sulphophenyl)-3-methyl-5-pyrazolone in 400 parts of water containing 80 parts of sodium chloride and enough sodium carbonate to keep the coupling mixture alkaline to litmus. Coupling is rapid and, when finished, the dyestuff is isolated and dried. It dyes wool from a dyebath containing sulphuric acid and Glauber's salt in yellow shades of very good fastness to washing, milling and light.

A dyestuff having similar properties and yielding slightly greener shades of yellow is obtained by using 22.65 parts of 4-amino-2-N-ethyl-ω-chloroacet-toluidide instead of the 21.25 parts of 4-amino-1-N-ethyl-ω-chloroacetanilide in the above recipe.

Example 2

21.25 parts of 4-amino-1-N-ethyl-ω-chloroacetanilide are diazotised as in Example 1. The cooled diazo solution is added to a solution at 5°–7° C. of 25.4 parts of 1-(4'-sulphophenyl)-3-methyl-5-pyrazolone in 400 parts of water containing 80 parts of sodium chloride and enough sodium carbonate to keep the coupling mixture alkaline to litmus. When coupling is finished a further 60 parts of sodium chloride are added, the mixture stirred for an hour and the dyestuff isolated and dried. It dyes wool in reddish-yellow shades from a dyebath containing sulphuric acid and Glauber's salt. The dyeings have very good fastness to severe washing, milling and light.

Example 3

To a solution of 28.65 parts of the sodium salt of 3-amino-ω-chloroacetanilide-4-sulphonic acid in 450 parts of water there are added 35 parts of 36% hydrochloric acid followed by 6.9 parts of sodium nitrite. The diazo solution so-obtained is added to a solution at 5°–7° C. of 33 parts of 1-(2':5'-dichloro-4'-sulphophenyl)-3-methyl-5-pyrazolone in 400 parts of water, which is kept alkaline during coupling by the addition of sodium carbonate as needed. When coupling is finished the new dyestuff is precipitated with sodium chloride, filtered, washed with saturated sodium chloride solution and dried. It dyes wool in greenish-yellow shades of very good fastness to severe washing, milling and light.

If in the above example instead of 33 parts of 1-(2':5'-dichloro-4'-sulphophenyl)-3-methyl-5-pyrazolone there are used 25.4 parts of 1-(4'-sulphophenyl)-3-methyl-5-pyrazolone, a reddish-yellow dyestuff is obtained having similar fastness properties.

Dyestuffs giving still redder shades of yellow on wool and having very good fastness to washing and milling are obtained by using instead of the 1-(2':5'-dichloro-4'-sulphophenyl)-3-methyl-5-pyrazolone equivalent amounts of 1-phenyl-3-methyl-5-pyrazolone or 1-(2'-chlorophenyl)-3-methyl-5-pyrazolone.

Example 4

A solution containing 28.65 parts of the sodium salt of 3-amino-ω-chloroacetanilide-4-sulphonic acid is diazotised as in Example 3. The diazo solution so-obtained is added to a solution at 5°–7° C. of 28.4 parts of 1-(4'-sulphophenyl)-5-pyrazolone-3-carboxylic acid in 400 parts of water which is kept alkaline during coupling by the addition of sodium carbonate as needed. The new dyestuff is isolated as in Example 3. It dyes wool from a dyebath containing sulphuric acid and Glauber's salt in reddish yellow shades of very good fastness to severe washing and milling.

Example 5

An aqueous solution containing the diazo compound corresponding to 18.45 parts of 4-amino-ω-chloroacetanilide (prepared by dissolving 28.65 parts of 4-ω-chloroacetylamino-phenyl sulphamate in 350 parts of water containing 25 parts of 36% hydrochloric acid and then adding an aqueous solution of 6.9 parts of sodium nitrite is added to a cooled solution of 25.4 parts of 1-(4'-sulphophenyl)-3-methyl-5-pyrazolone in 400 parts of water, the coupling medium being kept alkaline to litmus by means of sodium carbonate. The dye-stuff so obtained is precipitated by the addition of sodium chloride, filtered off, washed with brine, and dried. It dyes wool from a sulphuric acid bath in reddish-yellow shades, the dyeings having very good fastness to severe washing and milling.

Example 6

26.65 parts of 4-amino-1-N-cyclohexyl-ω-chloroacetanilide are diazotised in the ordinary way and the diazo compound combined with 28.85 parts of 1-(2'-chloro-5'-sulphophenyl)-3-methyl-5-pyrazolone in the presence of excess sodium carbonate and sodium chloride. The precipitated dyestuff so-obtained is filtered off and dried. It dyes wool from a dyebath containing sulphuric acid and Glauber's salt in yellow shades of very good fastness to severe washing, milling and light.

The corresponding dyestuffs from 25.4 parts of 1-(4'-sulphophenyl)-3-methly-5-pyrazolone or 1-(3'-sulphophenyl)-3-methyl-5-pyrazolone yield reddish-yellow shades on wool, the dyeings having similar fastness properties

Example 7

22.65 parts of 4-amino-1-N-isopropyl-ω-chloroacetanilide are dissolved in 300 parts of water and 25 parts of 36% hydrochloric acid and then 6.9 parts of sodium nitrite are added to the resulting solution. The diazo solution so-obtained, after cooling to 5°–7° C. is added to a cooled solution of 28.85 parts of 1-(2'-chloro-5'-sulphophenyl)-3-methyl-5-pyrazolone in 400 parts of water containing 80 parts of sodium chloride and sufficient sodium carbonate to keep the coupling mixture alkaline to litmus. Coupling is rapid and, when finished, the new dyestuff is isolated and dried. It dyes wool in greenish-yellow shades from a dyebath containing sulphuric acid and Glauber's salt, the dyeings having very good fastness to severe washing, milling and light and good fastness to perspiration.

It is superior to the corresponding dyestuff of Example 4 of British Patent No. 472,171 derived from diazotised 1-(N-acetyl-isopropyl-amino)-4-aminobenzene in fastness to washing and milling.

Example 8

27.45 parts of 3-amino-1-N-benzyl-ω-chloroacetanilide are diazotised in the usual manner and the solution of the diazo compound obtained, after filtration if necessary, added to a cooled aqueous solution of 28.85 parts of 1-(4'-chloro-2'-sulphophenyl)-3-methyl-5-pyrazolone containing an excess of sodium carbonate. The new dyestuff is precipitated by addition of sodium chloride, isolated, and dried. It dyes wool from an acid bath in greenish shades of yellow, the dyeings having very good fastness to severe washing, alkaline milling and light.

*Example 9*

26 parts of 4-amino-1-N-phenyl-ω-chloroacetanilide are dissolved in 400 parts of water and 25 parts of 36% hydrochloric acid and diazotised by the addition of 6.9 parts of sodium nitrite.

The filtered diazo solution is added to a cooled solution of 33 parts of 1-(2':5'-dichloro-4'-sulphophenyl)-3-methyl-5-pyrazolone in 400 parts of water containing an excess of sodium carbonate. The new dyestuff so-obtained is precipitated by the addition of common salt, filtered off, and dried. It dyes wool in reddish-yellow shades of very good fastness to severe washing and milling.

The invention is further illustrated by the examples listed in the following table:

dried. It dyes wool from a dyebath containing sulphuric acid and Glauber's salt in yellow shades, the dyeings having good fastness to severe washing, milling and light.

If in the above example 35.2 parts of the sodium salt of 1-(2':5'-dichloro-4'-sulphophenyl)-3-methyl-5-pyrazolone are used instead of the 1-(4'-sulphophenyl)-3-methyl-5-pyrazolone, a dyestuff yielding greenish-yellow shades on wool is obtained, the dyeings having good fastness properties.

*Example 46*

21.25 parts of 4-amino-1-N-ethyl-ω-chloroacetanilide are dissolved in a mixture of 320 parts of water and 25 parts of 36% hydrochloric acid and then 6.9 parts of sodium nitrite are added. The diazo compound so-obtained, after cooling to 5°–10° C. is added to a solution at 5° C. of 31 parts of 2-naphthol-6:8-disulphonic acid in 325 parts of water containing 80 parts of sodium chloride and sufficient sodium carbonate to keep the coupling mixture alkaline to litmus. When coupling is complete more sodium chloride is added, the mixture is stirred for some time, and the dyestuff filtered off and dried.

| Ex. No. | Diazo component | Coupling component | Shade given by the dyestuff on wool |
|---|---|---|---|
| 10 | 4-amino-1-N-n-butyl-ω-chloroacetanilide | 1-(2':5'-dichloro-4'-sulphophenyl)-3-methyl-5-pyrazolone | Yellow. |
| 11 | ......do...... | 1-(4'-sulphopheynl)-3-methyl-5-pyrazolone | Reddish-yellow. |
| 12 | ......do...... | 1-(3'-sulphophenyl)-3-methyl-5-pyrazolone | Do. |
| 13 | ......do...... | 1-(4'-sulphophenyl)-5-pyrazolone-3-carboxylic acid | Very reddish-yellow. |
| 14 | ......do...... | 1-(2'-methyl-5'-sulphophenyl)-3-methyl-5-pryazolone | Yellow. |
| 15 | ......do...... | 1-(2'-chloro-5'-sulphophenyl)-3-methyl-5-pyrazolone | Do. |
| 16 | ......do...... | 1-(4'-chloro-2'-sulphophenyl)-3-methyl-5-pyrazolone | Do. |
| 17 | ......do...... | 1-(2'-chloro-4'-methyl-5'-sulphophenyl)-3-methyl-5-pyrazolone. | Do. |
| 18 | ......do...... | 1-(6'-chloro-3'-methyl-4'-sulphophenyl)-3-methyl-5-pyrazolone. | Do. |
| 19 | ......do...... | 1-(4'-methoxy-2'-sulphophenyl)-3-methly-5-pyrazolone | Reddish-yellow. |
| 20 | 4-amino-1-N-isopropyl-ω-chloroacetanilide | 1-(2':5'-dichloro-4'-sulphophenyl)-3-methyl-5-pyrazolone | Yellow. |
| 21 | ......do...... | 1-(4'-sulphophenyl)-3-methyl-5-pyrazolone | Reddish-yellow. |
| 22 | ......do...... | 1-(2'-methyl-5'-sulphophenyl)-3-methyl-5-pyrazolone | Do. |
| 23 | ......do...... | 1-(3'-sulphophenyl)-3-methyl-5-pyrazolone | Do. |
| 24 | ......do...... | 1-(4'-chloro-2'-sulphophenyl)-3-methyl-5-pyrazolone | Yellow. |
| 25 | ......do...... | 1-(2'-chloro-4'-methyl-5'-sulphophenyl)-3-methyl-5-pyrazolone. | Do. |
| 26 | 4-amino-1-N-isopropyl-ω-chloroacetanilide | 1-(6'-chloro-3'-methyl-4'-sulphophenyl)-3-methyl-5-pyrazolone. | Do. |
| 27 | 4-amino-1-N-sec.-butyl-ω-chloroacetanilide | 1-(4'-sulphophenyl)-3-methyl-5-pyrazolone | Reddish-yellow. |
| 28 | 4-amino-1-N-cyclohexyl-ω-chloroacetanilide | 1-(2':5'-dichloro-4'-sulphophenyl)-3-methyl-5-pyrazolone | Yellow. |
| 29 | 4-amino-1-N-(o-methylcyclohexyl)-ω-chloroacetanilide. | ......do...... | Do. |
| 30 | 4-amino-1-N-(p-methylcyclohexyl)-ω-chloroacetanilide. | ......do...... | Do. |
| 31 | 4-amino-1-N-ethyl-ω-bromoacetanilide | ......do...... | Do. |
| 32 | 4-amino-2-N-ethyl-ω-chloroacet-toluidide | 1-(4'-sulphophenyl)-3-methyl-5-pyrazolone | Do. |
| 33 | ......do...... | 1-(4'-chloro-2'-sulphophenyl)-3-methyl-5-pyrazolone | Greenish-yellow. |
| 34 | ......do...... | 1-(2'-chloro-4'-methyl-5'-sulphophenyl)-3-methyl-5-pyrazolone. | Do. |
| 35 | ......do...... | 1-(6'-chloro-3'-methyl-4'-sulphophenyl)-3-methyl-5-pyrazolone. | Do. |
| 36 | ......do...... | 1-(2'-methyl-5'-sulphophenyl)-3-methyl-5-pyrazolone | Do. |
| 37 | 4-amino-2-N-benzyl-ω-chloroacet-toluidide | 1-(2':5'-dichloro-4'-sulphophenyl)-3-methyl-5-pyrazolone | Yellow. |
| 38 | ......do...... | 1-(4'-sulphophenyl)-3-methyl-5-pyrazolone | Reddish-yellow. |
| 39 | 4-amino-2-N-benzyl-ω-chloroacet-anisidide | ......do...... | Very reddish-yellow. |
| 40 | 4-amino-1-N-benzyl-ω-chloroacetanilide | 1-(4'-sulphophenyl)-3-methyl-5-pyrazolone | Reddish-yellow. |
| 41 | ......do...... | 1-(2':5'-dichloro-4'-sulphophenyl)-3-methyl-5-pyrazolone | Yellow. |
| 42 | 4-amino-ω-chloroacetanilide-3-sulphonic acid | ......do...... | Reddish-yellow. |
| 43 | 4-amino-2-N-ethyl-ω-chloropropionyl-toluidide | ......do...... | Greenish-yellow. |
| 44 | 4-amino-2-N-ethyl-ω-bromopropionyl-toluidine | ......do...... | Do. |

*Example 45*

28.5 parts of 4-amino-2-N-ethyl-α-bromopropionyl-toluidine (M. P. 116°–8° C.) are dissolved in a mixture of 350 parts of water and 25 parts of 36% hydrochloric acid and the solution cooled to 10° C. 6.9 parts of sodium nitrite are then added. The solution of the diazo compound so-obtained is cooled to 0°–5° C. and added to a stirred solution at 5° C. of 27.7 parts of the sodium salt of 1-(4'-sulphophenyl)-3-methyl-5-pyrazolone in 400 parts of water containing 80 parts of sodium chloride and 21 parts of sodium carbonate.

The new dyestuff so-obtained is isolated and dried. It forms an orange powder which dissolves in water with an orange colour and dyes wool from a dyebath containing sulphuric acid and Glaubers' salt in bright orange shades, the dyeings having very good fastness to severe washing, alkaline milling, sulphur stoving and light.

*Example 47*

21.25 parts of 4-amino-1-N-ethyl-ω-chloroacetanilide are diazotised as in Example 1. The cooled diazo solution is added to a solution at 5°–7° C. of 24.6 parts of the sodium salt of 1-naphthol-4-sulphonic acid in 350 parts of water containing 80 parts of sodium chloride and enough sodium carbonate to keep the coupling mixture alkaline to litmus. Coupling is rapid and the new dyestuff is filtered off and dried. It dyes wool from a dyebath containing sulphuric acid and Glauber's salt in scarlet shades. The dyeings have very good fastness to severe washing, milling, and sulphur stoving, and good fastness to light.

*Example 48*

21.25 parts of 4-amino-1-N-ethyl-ω-chloroacetanilide are diazotised as in Example 1. The cooled solution of the diazo compound is added to a solution at 5°–7° C. of 32.6 parts of the sodium salt of 1-naphthol-3:6-disulphonic acid in 325 parts of water containing 80 parts of sodium chloride and 21 parts of sodium carbonate. Coupling is rapid. More sodium chloride is added and the dyestuff is filtered off and dried. It dyes wool in scarlet shades, the dyeings having very good fastness to severe washing, milling, sulphur stoving and light.

*Example 49*

22.65 parts of 4-amino-2-N-ethyl-ω-chloroacettoluidide are dissolved in a mixture of 300 parts of water and 25 parts of 36% hydrochloric acid and then 6.9 parts of sodium nitrite are added.

The solution of the diazo compound so obtained is added to a stirred and cooled solution of 31 parts of 2-naphthol-6:8-disulphonic acid in 320 parts of water containing 80 parts of sodium chloride and 31.5 parts of sodium carbonate (calculated as anhydrous).

When coupling is complete the new dyestuff is salted out by addition of more sodium chloride, filtered off and dried. It dyes wool from a dyebath containing sulphuric acid and Glauber's salt in bright yellowish-orange shades of very good fastness to severe washing, milling and light.

If in the above example the 2-naphthol-6:8-disulphonic acid is replaced by the same weight of 2-naphthol-3:6-disulphonic acid, a dyestuff is obtained which dyes wool in very reddish-orange shades, the dyeings having very good fastness to severe washing and milling.

*Example 50*

25.7 parts of 4-amino-1-N-ethyl-ω-bromoacetanilide are diazotised and the diazo compound coupled with 31 parts of 2-naphthol-6:8-disulphonic acid in the presence of excess sodium carbonate. The dyestuff obtained dyes wool from a dyebath containing sulphuric acid and Glauber's salt in orange shades of very good fastness to severe washing, milling and light.

*Example 51*

A cooled aqueous solution containing the diazo compound corresponding to 18.45 parts of 4-amino-ω-chloroacetanilide (prepared by dissolving 28.65 parts of 4-ω-chloroacetylaminophenyl sulphamate in 350 parts of water containing 25 parts of 36% hydrochloric acid and then adding 6.9 parts of sodium nitrite) is added to a cooled solution of 31 parts of 1-naphthol-3:6-disulphonic acid in 400 parts of water, the coupling medium being kept alkaline to litmus by means of sodium carbonate.

The dyestuff is precipitated by addition of salt, filtered and dried. It dyes wool from an acid bath in yellowish-red shades of very good fastness to severe washing and milling.

4-chloroacetylaminophenyl sulphamate is obtained by reacting one molecular proportion of p-aminophenyl sulphamate with approximately 1.5 molecular proportions of chloroacetyl chloride in a mixture of saturated aqueous sodium acetate and glacial acetic acid according to the general method for the chloroacetylation of amines described in the Journal of the American Chemical Society, vol. 39, p. 1441. The chloroacetyl derivative is precipitated, by the addition of sodium chloride if necessary, filtered off and washed with small quantities of 50% acetic acid. The acid paste so obtained can be used directly for the preparation of dyestuffs.

The diazo compound of 3-amino-ω-chloroacetanilide is prepared in a similar way from 3-ω-chloroacetylaminophenyl sulphamate and when coupled with 1-naphthol-3:6-disulphonic acid gives a yellower shade than the above dyestuff.

*Example 52*

26.65 parts of 4-amino-1-N-cyclohexyl-ω-chloroacetanilide (M. P. 158°–9° C.) are diazotised in the ordinary way and the diazo compound combined with 22.4 parts of 2-naphthol-8-sulphonic acid in the presence of excess sodium carbonate. The new dyestuff is isolated by salting and dried. It dyes wool from a dyebath containing sulphuric acid and Glauber's salt in orange shades of very good fastness to severe washing and alkaline milling and good fastness to light.

If in the above example instead of 22.4 parts of 2-naphthol-8-sulphonic acid there is employed the same amount of 2-naphthol-6-sulphonic acid a dyestuff is obtained which yields on wool redder shades of orange, the dyeings having similar fastness properties. The corresponding dyestuff from 30.5 parts of 2-naphthol-6:8-disulphonic acid yields on wool somewhat yellower shades of orange, the dyeings having very good fastness to severe washing, milling, perspiration and light.

*Example 53*

22.65 parts of 4-amino-1-N-isopropyl-ω-chloroacetanilide (M. P. 122°–3° C.) (obtained by reacting 4-nitro-N-isopropylaniline with chloroacetyl chloride in dry toluene to give 4-nitro-N-isopropyl-ω-chloroacetanilide (M. P. 108–9° C.) and reducing the nitro compound with iron and hydrochloric acid in ethyl or methyl alcoholic solution) are diazotised by the method of Example 1. The diazo solution so obtained is added to a cooled aqueous solution of 31 parts of 2-naphthol-6:8-disulphonic acid containing excess of sodium carbonate.

The new dyestuff is precipitated by salting, filtered off and dried. It dyes wool and silk in bright yellowish-orange shades, the dyeings having very good fastness to severe washing, milling, perspiration and light.

If in the above example instead of 31 parts of 2-naphthol-6:8-disulphonic acid there are employed 22.4 parts of 1-naphthol-4-sulphonic acid a dyestuff is obtained yielding scarlet shades on wool, the dyeings having very good fastness to severe washing and milling and good fastness to perspiration and light. The corresponding dyestuff from 22.4 parts of 1-naphthol-5-sulphonic acid yields redder shades still, the dyeings having similar fastness properties.

*Example 54*

27.45 parts of 3-amino-1-N-benzyl-ω-chloroacetanilide are diazotised in the usual way and the solution of the diazo compound obtained, after filtration if necessary, combined with 22.4 parts of 1-naphthol-4-sulphonic acid in the presence of excess sodium carbonate. The new dyestuff is filtered off and dried. It dyes wool from an acid bath in very yellowish-scarlet shades of very good fastness to severe washing and milling.

3-amino-1-N-benzyl-ω-chloroacetanilide can be obtained by reacting 3-nitro-N-benzylaniline with chloroacetyl chloride in dry toluene to give 3-nitro-1-N-benzyl-ω-chloroacetanilide (M. P. 80–81° C.). The nitro-body is then reduced with tin and hydrochloric acid in boiling methyl alcohol or ethyl alcohol solution, the solvent removed under reduced pressure, the crude amine and tin precipitated together by cautious addition of dilute aqueous caustic soda to slight Brilliant Yellow alkalinity, and the precipitate, after filtration and washing with cold water, extracted with benzene. The benzene solution is concentrated when the desired amine crystallises out. It is purified by recrystallisation from benzene or by solution in dilute hydrochloric acid, filtration, and basification, and has M. P. 95°–96° C.

The invention is further illustrated by the examples listed in the following table:

obtained is added to a solution at 5°–7° C. of 31 parts of 2-naphthol-6:8-disulphonic acid in 300 parts of water containing 80 parts of sodium chloride and sufficient sodium carbonate to keep the coupling medium alkaline during coupling.

The dyestuff so-obtained is precipitated by further addition of sodium chloride if necessary, filtered off, and dried.

It dyes wool from a dyebath containing sulphuric acid and Glauber's salt in yellowish scarlet shades of very good fastness to severe washing and milling.

If in the above example the 31 parts of 2-naphthol-6:8-disulphonic acid are replaced by 14.4 parts of α-naphthol (dissolved by means of one equivalent of caustic soda) a dyestuff is obtained which yields on wool reddish-brown shades, the dyeings having good fastness to severe washing and alkaline milling.

The use of 14.4 parts of β-naphthol in place of the α-naphthol results in a dyestuff giving orange-brown shades on wool of very good fastness to severe washing.

British Patent No. 216,971 describes the man-

| Ex. No. | Diazo component | Coupling component | Shade given by dyestuff on wool |
|---|---|---|---|
| 55 | 4-amino-1-N-n-butyl-ω-chloroacetanilide (M. P. 89°–90° C.). | 2-naphthol-6:8-sulphonic acid | Orange. |
| 56 | do | 1-naphthol-3-sulphonic acid | Dull scarlet. |
| 57 | do | 1-naphthol-4-sulphonic acid | Scarlet. |
| 58 | do | 2-naphthol-8-sulphonic acid | Orange. |
| 59 | 4-amino-1-N-isopropyl-ω-chloroacetanilide | 1-naphthol-3:6-disulphonic acid | Scarlet. |
| 60 | 4-amino-2-N-ethyl-ω-chloroacet-toluidide | do | Yellowish scarlet. |
| 61 | 4-amino-1-N-n-butyl-ω-chloroacetanilide | do | Scarlet. |
| 62 | 4-amino-1-N-cyclohexyl-ω-chloroacetanilide | do | Do. |
| 63 | do | 1-naphthol-4-sulphonic acid | Do. |
| 64 | do | 1-naphthol-5-sulphonic acid | Bluish-scarlet. |
| 65 | 4-amino-1-N-(o-methylcyclohexyl)-ω-chloroacetanilide | 2-naphthol-6:8-disulphonic acid | Orange. |
| 66 | 3-amino-1-N-benzyl-ω-chloroacetanilide | do | Yellowish orange. |
| 67 | 4-amino-1-N-benzyl-ω-chloroacetanilide | 2-naphthol-6:8-disulphonic acid | Orange. |
| 68 | 4-amino-2-N-benzyl-ω-chloroacet-toluidide | do | Yellowish-orange. |
| 69 | 4-amino-2-N-benzyl-ω-chloroacet-anisidide | do | Orange. |
| 70 | 4-amino-1-N-phenyl-ω-chloroacetanilide (M. P. 102–4° C.). | do | Reddish-orange. |
| 71 | 4-amino-1-N-isobutyl-ω-chloroacetanilide | 1-naphthol-4-sulphonic acid | Scarlet. |

*Example 72*

28.5 parts of 4-amino-2-N-ethyl-α-bromopropionyl-toluidide (M. P. 116–8° C.) are dissolved in a mixture of 350 parts of water and 25 parts of 36% hydrochloric acid and the solution cooled to 10° C. 6.9 parts of sodium nitrite are then added. The solution of the diazo compound so-obtained is cooled to 0°–5° C. and added to a stirred solution at 5° C. of 31 parts of 2-naphthol-6:8-disulphonic acid in 320 parts of water to which have been added 80 parts of sodium chloride and 31 parts of anhydrous sodium carbonate. When coupling is complete the new dyestuff is completely precipitated by the addition of a further 100 parts of sodium chloride, filtered off, and dried. It dyes wool from an acid bath in bright yellowish-orange shades of good fastness to washing, milling and light.

By employing 22.4 parts of 1-naphthol-4-sulphonic acid instead of the 31 parts of 2-naphthol-6:8-disulphonic acid a scarlet dyestuff is obtained yielding dyeings on wool of good fastness to washing, milling and light. Diazotised 4-amino-2-N-ethyl-ω-bromopropionyl-toluidide (M. P. 122–3° C.) gives dyestuffs of similar shade.

*Example 73*

To a cooled aqueous solution containing 28.65 parts of the sodium salt of 4-amino-ω-chloroacetanilide-3-sulphonic acid there are added 35 parts of 36% hydrochloric acid followed by 6.9 parts of sodium nitrite. The diazo solution soufacture of azo dyestuffs by combining a diazo compound of a benzene derivative which contains an alkylacidylamino group with an azo dyestuff component. The dyestuffs of the present invention are superior to the corresponding pyrazolone dyestuffs known from the said specification in fastness to severe washing and milling.

Further, the provisional specification of British Patent No. 216,971 refers to the coupling of a diazo compound of a benzene derivative which contains an alkylacidylamino group with an azo dyestuff component to yield colouring matters which are said to dye wool from yellow to brown to blue-red shades which are fast to milling and are distinguished by their good equalising properties. No example is given in the said specification of an orange or scarlet dyestuff nor is any mention made of a naphthol sulphonic acid coupling component. Further, none of the diazo components disclosed in the said specification contains as its acidyl group any acidyl groups coming within the scope of the present invention.

British Patent No. 281,713 claims a manufacture of azo dyestuffs for animal fibres such as wool by coupling with a pyrazolone a diazo compound of 2:4-phenylenediamine-1-sulphonic acid acidylated in the 4-position or a nuclear substitution product thereof, and derived from a mono- or a di-basic acid. No mention is made of diazo components containing the acidyl groups employed according to the present invention. Further, the dyestuffs of the present invention are superior on wool to the dyestuffs known from the said specification in fastness to severe washing and alkaline milling.

British Patent No. 340,640 describes the manufacture of azo dyestuffs for wool by combining a diazo compound of an N-acyl-cyclohexylamino-arylamine or of a substitution product thereof with an azo component containing a sulphonic and/or carboxylic acid group. The orange dyestuffs known from Examples 1 and 4 of the said specification are inferior to the orange dyestuffs of the present invention as regards fastness to severe washing. The yellow dyestuff known from Example 4 (end) of the said patent is inferior to yellow dyestuffs of the present invention as regards fastness to severe washing.

British Patent No. 472,171 describes the manufacture of azo dyestuffs for wool by combining diazo compounds of amines of the general formula:

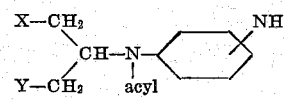

(in which X and Y stand for a hydrogen atom or a methyl group and the benzene nucleus may contain further substituents) with any coupling components such that the dyestuffs formed contain at least one solubilising group derived either from the diazo compound or coupling component.

The dyestuffs of the present invention are superior to the dyestuffs known from the said specification in fastness to washing and milling.

I claim:

1. An azo dye containing at least one sulfonic acid group which is represented by the formula

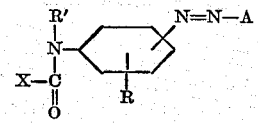

wherein

is a haloalkacyl group having 1 to 3 carbons in the X group wherein the halogen atom is from the group consisting of chlorine and bromine; R is one of a group consisting of hydrogen, methyl, methoxy and sulfonic acid; R' is one of a group consisting of hydrogen, alkyl having 1 to 4 carbons, cyclohexyl, methyl-cyclohexyl, phenyl-R and benzyl; and A is the residue of an azo dye coupling component of the group consisting of aryl-pyrazolones of the benzene and naphthalene series and naphthols represented by the formula

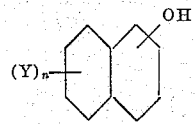

wherein Y is from a group consisting of hydrogen and sulfonic acid and $n$ is an integer not greater than 2.

2. An azo dye containing at least one sulfonic acid group represented by the formula

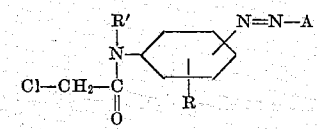

in which R is one of a group consisting of hydrogen, methyl, methoxy and sulfonic acid; R' is one of a group consisting of hydrogen, alkyl having 1 to 4 carbons, cyclohexyl, methyl-cyclohexyl, phenyl-R and benzyl; and A is the residue of an azo dye coupling component of the group consisting of aryl-pyrazolones of the benzene and naphthalene series and naphthols represented by the formula

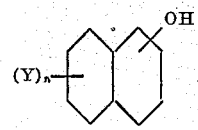

wherein Y is from a group consisting of hydrogen and sulfonic acid and $n$ is an integer not greater than 2.

3. An azo compound which in its acid form is represented by the formula

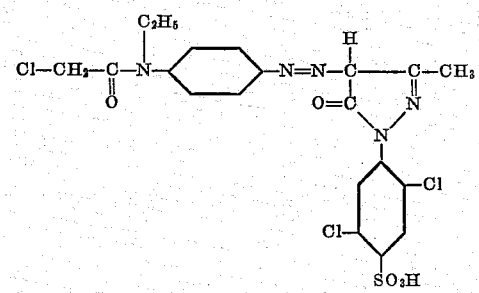

4. A compound in accordance with claim 2 wherein the coupled radical is the residue of 2-naphthol-6,8-disulfonic acid.

5. A compound in accordance with claim 2 wherein the coupled radical is the residue of 1-naphthol-4-sulfonic acid.

ARTHUR HOWARD KNIGHT.